United States Patent [19]
DiGiovanni et al.

[11] Patent Number: 5,596,668
[45] Date of Patent: Jan. 21, 1997

[54] SINGLE MODE OPTICAL TRANSMISSION FIBER, AND METHOD OF MAKING THE FIBER

[75] Inventors: David J. DiGiovanni, Montclair; Kenneth L. Walker, New Providence, both of N.J.

[73] Assignee: Lucent Technologies Inc., Murray Hill, N.J.

[21] Appl. No.: 497,346

[22] Filed: Jun. 30, 1995

[51] Int. Cl.$^6$ ................................................ G02B 6/16
[52] U.S. Cl. ............................ 385/123; 65/417; 385/127; 385/144
[58] Field of Search ......................... 385/100, 102, 385/109, 123, 124, 126, 127, 128, 141, 144; 65/413, 414, 417–420

[56] References Cited

U.S. PATENT DOCUMENTS

| | | | |
|---|---|---|---|
| 4,691,990 | 9/1987 | Cohen et al. | 385/127 |
| 4,717,236 | 1/1988 | Dewing | 385/109 |
| 5,240,488 | 8/1993 | Chandross et al. | 65/3.11 |
| 5,274,734 | 12/1993 | Jin et al. | 385/142 |

OTHER PUBLICATIONS

"Hydrogen–induced Hydroxyl Profiles in Doped Silica Layers", by J. Kirchhof et al., *OFC 1995 Technical Digest*, Optical Fiber Communication, Feb. 26–Mar. 3, 1995, San Diego Convention Center, San Diego, California, paper WP9.

"Hydroxyl Formation in Quartz Glass Tubes and Layers Due to Oxy–Hydrogen Flames", by J. Kirchhof et al., Symposium J: Optical Waveguide Materials, Dec. 2–4, 1991, Proceedings published as vol. 244 of the Materials Research Society Symposium Proceedings Series, p. 362.

*Primary Examiner*—John D. Lee
*Attorney, Agent, or Firm*—Oleg E. Alber; Eugen E. Pacher

[57] ABSTRACT

We have discovered that hydrogen-related loss in silica-based single mode transmission optical fiber can be reduced or eliminated by use of a substrate tube that contains hydrogen getter sites. Exemplarily, substrate tubes according to the invention are doped with Ge or P.

8 Claims, 1 Drawing Sheet

SINGLE MODE OPTICAL TRANSMISSION FIBER, AND METHOD OF MAKING THE FIBER

FIELD OF THE INVENTION

This invention pertains to silica-based single mode optical transmission fiber, and to a method of making the fiber.

BACKGROUND OF THE INVENTION

Fabrication of optical fiber by MCVD, a widely used process, includes depositing glassy material on the inside wall of a substrate glass tube, typically a nominally pure silica tube. The preform is then collapsed into a solid preform, from which fiber is drawn by a conventional technique.

Although typically being nominally pure (i.e., not intentionally doped) silica, conventional substrate tubes have relatively high (e.g., 1 dB/km) optical loss at wavelengths of interest for signal transmission, e.g., 1.54 µm. It is thus necessary to ensure that substantially no optical signal power extends into the substrate-derived cladding of optical fiber. This is typically achieved through deposition on the inside of the substrate tube of a sufficient amount of cladding glass, followed by deposition thereon of the core glass.

In a widely used, commercially available single mode optical fiber for long-distance signal transmission, about 80% of the optical power is transmitted through the core of the fiber, with the remainder transmitted through the deposited cladding. The deposited cladding layer has to be thick enough to prevent extension of a significant fraction of the optical power into the substrate tube-derived (outer) cladding of the fiber. In the above referred-to optical fiber this currently is achieved by provision of enough deposited cladding glass to result in D/d ~3.2, where D and d are, respectively, the outer diameter of the deposited cladding and the core diameter, either in the fiber or in the collapsed preform.

For obvious economic reasons, it would be highly desirable to increase the length of fiber that can be drawn from a given preform. However, straight-forward scaling-up of the preform does not appear feasible, due inter alia to the large amount of deposited glass that would be required. By way of example, a scaled-up preform that can yield 500 km of the above referred-to optical fiber would require a cladding deposit of 17 mm. It is unlikely that so much glass could be deposited on the inside of a tube in a cost-effective manner.

It will thus be necessary to make changes in fiber design and/or process parameters to make it possible to increase the length of fiber that can be drawn from a preform. This application discloses changed fiber designs and process parameters that can facilitate increased fiber yield per preform. In particular, this application discloses an optical fiber that comprises appropriately placed hydrogen gettering means.

U.S. Pat. No. 5,274,734 discloses silica-based optical fiber that further contains in its core Ge, Al and a rare earth, and that is provided with means for preventing hydrogen to reach the core of the (active) fiber during the anticipated service life of the fiber, so as to avoid or minimize changes in the loss of the fiber over the service life of the fiber. Exemplarily, the means comprise silica cladding material that contains hydrogen gettering sites, thereby reducing the indiffusion of hydrogen from the ambient into the Si—Ge—Al-rare earth-containing core of the fiber.

THE INVENTION

Figure 2:
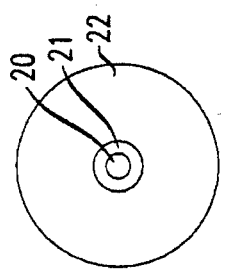
FIGS. 2–4 show exemplary embodiments of the invention.

We have made the discovery that during glass deposition and preform collapse hydrogen can diffuse through the, relatively massive, substrate tube. The sources of the diffusing hydrogen are likely the (commonly used) oxy-hydrogen torches that are used to heat the substrate tube.

We have also found that in conventional fiber designs (generally involving relatively large D/d, for instance, D/d=3.2) this in-diffusion of hydrogen does not pose a serious problem, since the hydrogen can be gettered in the deposited cladding region. For instance, the above referred-to commercially available fiber comprises a P-and-F-doped outer deposited cladding and a Ge-and-F-doped inner deposited cladding. Hydrogen gettering can take place in one or both of these deposited cladding regions, whereby migration of hydrogen into the inner deposited cladding region and the core is prevented.

The described approach, however, would not be feasible in preforms that have substantially lower (e.g., ≦2.5) D/d, since in such fiber the gettered hydrogen would be too close to the core and would result in unacceptable added signal attenuation.

It will be understood that the above discussion pertains to (passive) transmission fiber in which substantially no amount of added loss is acceptable, and does not pertain to active (e.g., rare earth-doped) fiber in which some added loss can be acceptable since it generally can be compensated by additional gain. Transmission fiber essentially does not contain any rare earths, and typically does essentially not contain Al.

We have discovered that the above-discussed problem of hydrogen-induced added loss in transmission fiber can be solved by provision of an effective number of hydrogen getter sites that are located sufficiently far from the fiber core such that the optical power in the getter region is low, exemplarily <$10^{-4}$ of the power in the core.

In preferred embodiments the getters are distributed throughout the substrate tube. The invention, however, is not so limited. For instance, the getters can be contained in an outer tube which is collapsed around a conventional (substantially getter-free) substrate tube.

The invention exemplarly is embodied in a silica-based single mode optical transmission fiber comprising a core of diameter d, a deposited cladding of diameter D contactingly surrounding the core, and a tube-derived cladding contactingly surrounding the deposited cladding.

Significantly, the tube-derived cladding contains hydrogen getter sites selected to substantially prevent diffusion of hydrogen into the deposited cladding during manufacture of the fiber, including manufacture of the preform. Embodiments of the invention typically have D/d <3.2, preferably <2.5. The concentration of hydrogen getter sites will typically be such that the rate of hydrogen migration through the substrate tube wall at the conventional processing temperatures (typically in the range 1500° to 2300° C.) is reduced by at least 50% (preferably by at least 90%), as compared to an otherwise identical prior art substrate tube that does not contain deliberately introduced hydrogen getter sites. The rate of hydrogen diffusion through the tube wall can be determined by known means, e.g., by mass spectroscopy.

The invention is also embodied in a method of making silica-based single mode optical transmission fiber. The method comprises making a preform that comprises tube-derived silica-based material and deposited silica-based material, and drawing the fiber from the preform. Making the preform comprises providing a silica-based substrate tube that contains a concentration of hydrogen getter sites sufficient to substantially prevent migration of hydrogen into the deposited silica-based material during making of the preform and drawing of the fiber.

Substrate tubes according to the invention can be produced by any of the currently known methods of making silica tubes, provided the selected method is adapted to result in introduction of an effective number of hydrogen getter sites. For instance, the tube can be produced by a currently commercially used process that involves soot formation and deposition, the process modified to result in deposition of Ge-doped (or possibly Ge- and F-doped) silica. The tube can also be produced by the known sol/gel process (see, for instance, U.S. Pat. No. 5,240,488), again modified to result in formation of a Ge-doped (or possibly Ge- and F-doped) silica-based porous body that can be consolidated into a unitary silica-based doped substrate tube.

Typically the selected process will be modified such that the resulting tube contains less than about 1 atomic % $GeO_2$ or other hydrogen getter material (e.g., $P_2O_5$). If it is desired that the substrate tube according to the invention has a refractive index that is close to that of pure silica then co-doping with F is contemplated. F-doped substrate tubes are disclosed, for instance, in U.S. Pat. No. 4,691,990.

Figure 1:
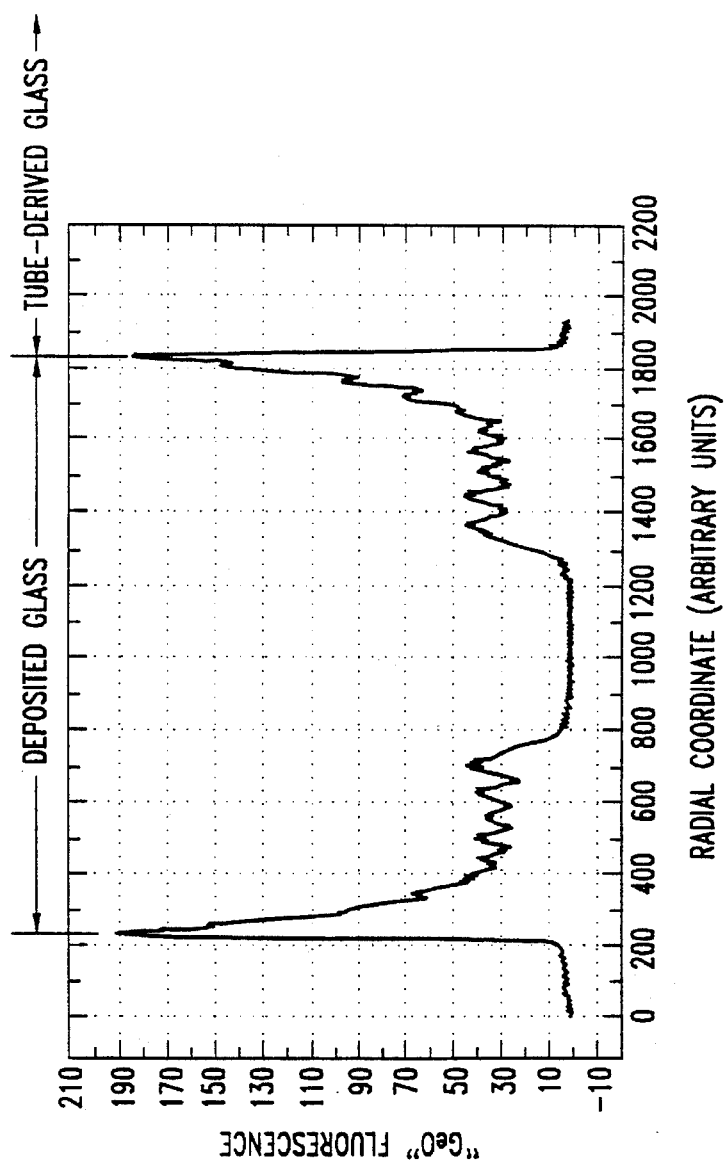
FIG. 1 shows the fluorescence associated with the "GeO" defect as a function of the radial coordinate.

FIG. 1 demonstrates the effectiveness of Ge-doping for hydrogen gettering at high temperature. The figure shows the "GeO" fluorescence in an exemplary silica-based cylindrical test structure as a function of the radial coordinate. The central deposited region was P-doped, the outer deposited region (10 layers) was $GeO_2$-doped, and the tube-derived outermost region was nominally pure silica. As can be seen from FIG. 1, the "GeO" fluorescence is localized in the outermost region of the deposited cladding, indicative of hydrogen gettering in that region such that substantially no hydrogen penetrated to the inner deposited material. We believe that the observed hydrogen derived from the oxy-hydrogen torches used during deposition and collapse, and that the "GeO" fluorescence (~0.4 μm wavelength) in Ge-doped material at a given radial coordinate is directly proportional to the concentration of hydrogen at that location in the preform or fiber.

The hydrogen getter sites need not be distributed uniformly throughout a substrate tube according to the invention. For instance, a Ge-doped tube can be placed over a conventional silica tube and collapsed thereon, resulting in a compound substrate tube containing a Ge-doped outer portion and a nominally undoped inner portion. The Ge-doped tube itself need not contain a uniform concentration of hydrogen getter sites. For instance, an effective thickness of Ge-doped silica can be deposited on the outside and/or the inside of the tube. Still furthermore, the Ge-doped tube need not be collapsed onto the outside of the nominally pure tube. Instead, the nominally pure tube could be collapsed onto the outside of the Ge-doped tube. The latter approach is, however, not preferred since it can place gettering sites relatively close to the optically active portion of the fiber.

Figure 3:
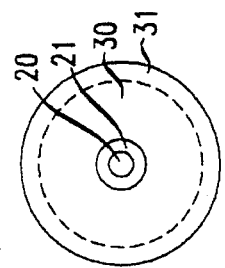
Figure 4:
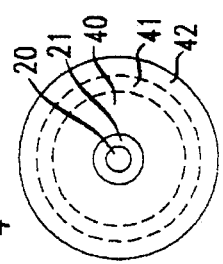

FIGS. 2–4 schematically show in cross section exemplary optical fibers or preforms according to the invention. In FIG. 2, numerals 20, 21 and 22 refer, respectively, to the core, the deposited cladding, and the tube derived cladding, with the latter containing a substantially uniform distribution of hydrogen gettering sites, e.g., sites associated with Ge or P.

In FIG. 3, numerals 30 and 31 together refer to the compound tube-derived cladding, with the former referring to the substantially getter site-free (nominally pure silica) inner portion of the compound cladding, and the latter referring to the getter site-containing outer portion of the cladding.

In FIG. 4, numerals 40–42 together refer to the compound tube-derived cladding, with 40 and 42 designating substantially getter site-free portions thereof, and 41 designating the getter site-containing portion.

The references to hydrogen gettering by Ge-doped silica are exemplary only, and are not meant to limit the invention. For instance, sites associated with P in silica react with hydrogen and are contemplated as hydrogen getter sites.

Example 1: A conventionally produced sol-gel tube was dehydroxilated in a 10% $O_2$/He mixture to remove moisture and organic binder, then held in an 80% humidity environment for several days to re-hydrate it. The tube was then soaked in a 10% solution of phosphoric acid in methanol for several days until bubbles stopped appearing on the surface. Subsequently the tube was dried in a vertical position for several days, followed by firing in a 10% $Cl_2$/He mixture up to 800° C. to de-hydrate, and then to 1450° C. in pure He to sinter. Mass spectrometry indicates that the rate of hydrogen migration through the P-doped tube is less than 90% of the rate through an otherwise identical, nominally pure silica tube, when the outsides of the respective tubes are heated with oxy-hydrogen torches. Similar results are obtained with a similarly produced Ge-doped silica tube.

Example 2: In a 21×25 mm conventional synthetic silica tube are deposited, in sequence, a layer of pure silica, more than 8 layers of Ge-doped silica (3.65 g/min $SiCl_4$, 2.4 l/min $O_2$, 0.08 g/min $GeCl_4$, torch speed 8 cm/min), and one layer of P-doped silica (replacing the $GeCl_4$ with 0.11 g/min $POCl_3$). The tube is blown out to a diameter of about 29 mm, and slipped over a 19×25 mm synthetic silica tube. The composite tube is then stretched to obtain a cross sectional area of 207 mm². On the inside of the thus produced composite tube with gettering sites is deposited conventional deposited cladding material and core material, with D/d <2.5. After conventional collapse of the thus produced tubular body, fiber is drawn from the preform. The fiber has loss at 1.54 μm substantially the same as conventional transmission fiber with D/d=3.2.

The invention claimed is:

1. Single mode optical transmission fiber comprising a core of diameter d, a deposited cladding of diameter D contactingly surrounding the core, and a tube-derived cladding contactingly surrounding the deposited cladding,

CHARACTERIZED IN THAT the tube-derived cladding contains hydrogen getter sites selected to substantially prevent migration of hydrogen into the deposited cladding during manufacture of the fiber, and D and d are selected such D/d <2.5.

2. Fiber according to claim 1, wherein the tube-derived cladding is derived from a substrate tube that contains hydrogen getter sites effective for reducing, at a processing temperature, the rate of hydrogen migration through the substrate tube wall by at least 50%, as compared to the rate of hydrogen migration at the processing temperature through the wall of an otherwise identical comparison tube that does substantially not contain hydrogen getter sites.

3. Fiber according to claim 1, wherein the hydrogen getter sites comprise an element selected from the group consisting of Ge and P.

4. Fiber according to claim 3, wherein the tube-derived cladding comprises sol-gel-derived silica-based glass.

5. Fiber according to claim 4, wherein the hydrogen getter sites are substantially uniformly distributed throughout the tube-derived cladding.

6. Fiber according to claim 1, wherein the tube-derived cladding is derived from a compound substrate tube comprising at least an inner and an outer tube, with said hydrogen getter sites substantially confined to one of said inner and outer tubes.

7. Fiber according to claim 6, wherein the hydrogen getter sites comprise an element selected from the group consisting of Ge and P and are substantially confined to the outer tube.

8. Method of making silica-based optical transmission fiber comprising a core of diameter d, a deposited cladding of outer diameter D contactingly surrounding the core, and a tube-derived cladding contactingly surrounding the deposited cladding, the method comprising making a preform and drawing the fiber from the preform, the preform comprising tube-derived as well as deposited silica-based material;

CHARACTERIZED IN THAT making the preform comprises providing a silica-based substrate tube that contains a concentration of hydrogen getter sites sufficient to substantially prevent migration of hydrogen into the deposited silica-based material during making of the preform and drawing of the fiber, and further comprises selecting the deposited silica-based material such that the optical transmission fiber has D/d <2.5.

\* \* \* \* \*